March 5, 1963  R. W. PRICE  3,079,670
SLITTING TOOL
Filed Sept. 8, 1959
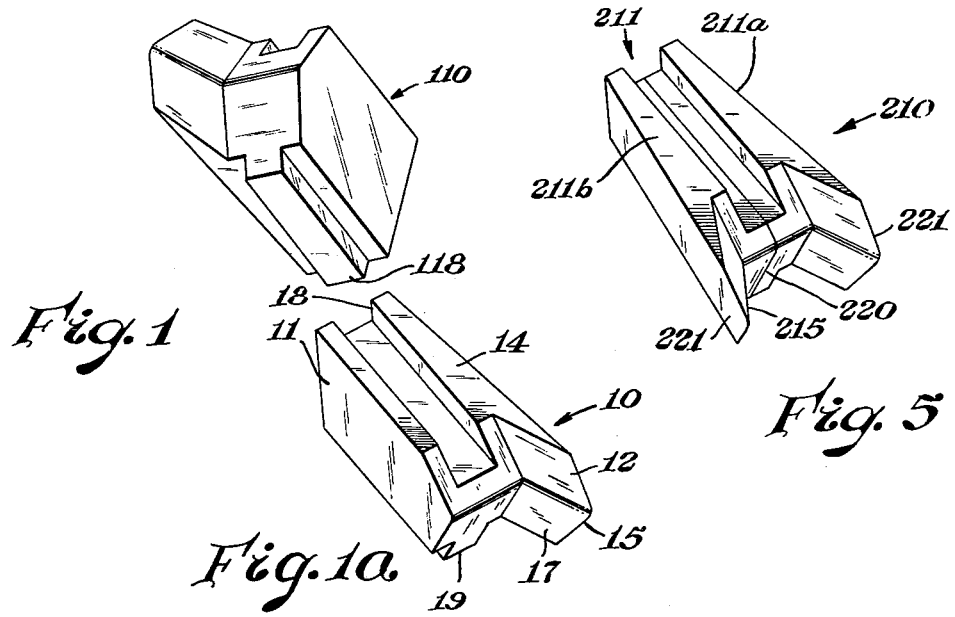
Fig. 1
Fig. 1a
Fig. 5
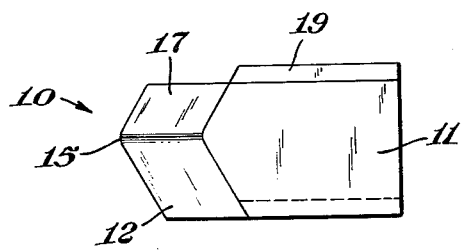
Fig. 2
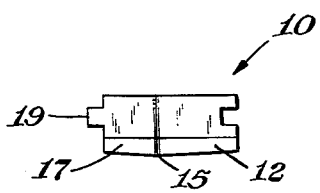
Fig. 4
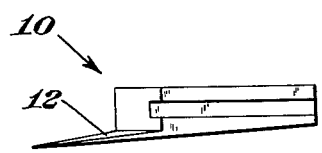
Fig. 3
INVENTOR.
Robert W. Price
BY
ATTORNEY

United States Patent Office 3,079,670
Patented Mar. 5, 1963

3,079,670
SLITTING TOOL
Robert W. Price, Auburn, Mich., assignor to The Dow Chemical Company, Midland, Mich., a corporation of Delaware
Filed Sept. 8, 1959, Ser. No. 838,778
3 Claims. (Cl. 29—95)

This invention relates to an improved tool for slitting thermoplastic film.

More particularly, it relates to an improved tool for slitting thermoplastic film without unwinding it from the ordinarily wound or rolled supply package in which it is obtained.

It is conventional practice in the manufacture of thermoplastic film to produce a relatively wide membrane by either sheet extrusion or bubble extrusion. This wide sheet may oftentimes be subsequently slit to a desired width, since it is generally more advantageous to initially and directly produce wide sheet and later cut or slit it into suitable more narrow widths, as may be desired or required. After extrusion, the wide, uncut film is generally wound into large rolls containing up to 10,000 or more feet in length. Such rolls are then taken to a slitting machine, where they are unwound and the single sheet or film is passed over stationary or rotary knives.

Thus, in practice of the conventional technique, the sheet is cut to a desired width by slitting only a single thickness at a time. The slit film is then rewound to give a roll of the desired dimensions.

A bifurcated tool for cutting supply rolls of various thermoplastic film has been described in a copending application by Philip G. Kessel and Kenneth J. Cleereman, Serial No. 838,487, filed even date herewith. Such a slitting tool has provided increased slitting speeds over previously known methods and apparatus for performing this operation. However, the particular design of the tool is found to require very frequent sharpening and is prone to breakage. A carefully controlled radial feed rate of the tool into the roll must be employed to avoid jamming of the film between the cutting bits.

It would be advantageous to have available a tool or knife which would not require frequent sharpening for cutting relatively wide rolls of thermoplastic film to desired narrower widths without fusing together of the freshly prepared edges.

It also would be advantageous if such a slitting knife were relatively resistant to breakage during operation.

It would particularly be advantageous if such a knife or bit were available which would allow increased cutting rates of such film.

It would be most advantageous if such a knife or cutting bit were available which would permit the employment of less precise requirements for radial feed control.

These and other beneficial results and advantageous benefits may be achieved with a cutting bit fabricated in accordance with the present invention comprising a slitting knife adapted to be radially fed into rotating roll of sheet material, said knife comprising a body having affixed thereto a blade; said body and said blade each having one generally coplanar surface, said coplanar surface of said blade terminating in a generally arcuate convex edge remote from said body, said blade having at least one opposed surface generally opposite to and forming an angle of from about 5 to about 30 degrees with said coplanar surface, said surfaces intersecting at said convex edge, and said opposed surface intersecting said body.

Further features and advantages of the invention will be more apparent in the following description and specification taken in connection with the accompanying drawing, wherein:

FIGURES 1 and 1a illustrate a perspective view of right and left handed cutting bits in accordance with the invention;

FIGURE 2 shows a side view of a left hand cutting bit or knife;

FIGURE 3 depicts a top view of a left hand slitting knife or bit;

FIGURE 4 delineates an end view of a cutting bit or knife viewed from the cutting end; and FIGURE 5 portrays a perspective view of an alternate embodiment of the invention where two blades are affixed in substantially side-by-side arrangement to a common body.

In FIGURES 1 and 1a there is illustrated a perspective view of a left handed slitting knife or bit, indicated generally by the reference number 10, and a perspective view of a right hand slitting knife or bit, indicated generally by the reference number 110. The tool 10 comprises a body section 11 having affixed thereto a blade 12. The body 11 and the blade 12 each have one generally coplanar surface (not shown), terminated on two sides by the edge 14 and the generally arcuate convex cutting edge 15. Opposite to the coplanar surfaces (not shown) on the blade 12 is an opposed surface 17 which forms an angle with the coplanar surface (not shown) of from about 5 to about 30 degrees. In the upper face of the body 11 of the tool 10 is a keyway 18 designed to mate with key or land 118 of tool 110. The corresponding key or land 19 is located on the opposite surface of the body 11. The tools or knives 10 and 110 are generally prepared substantially as mirror images of each other when their intended use is circumferentially slitting a supply roll of film or sheet material.

FIGURE 2 shows a side view of tool 10 showing the inner face of blade 12. A single piece of stock may be employed to form the knife body 11 and blade 12. The opposed surface 17 terminates by joining with the adjacent surface of the body 11. The land or key 19 projects from the body 11 to engage a corresponding groove in a mating tool of the opposite hand as illustrated in FIGURE 1 or into a tool holder body (not shown).

In FIGURE 3 there is shown a top view of the knife 10 illustrating the arrangement of the blade 12 and the form of the inner surface 17. The groove 18 is positioned in the upper surface of the body 12.

In FIGURE 4, there is illustrated an end view of the knife or cutting bit 10 illustrating the locking groove 18, the land or key 19 and the position of the arcuate cutting edge 15. The cutting edge 15 is formed by the junction of the generally coplanar surface of the body 10 and the blade 12 and the inner or opposed surface 17 of the blade 12.

In operation, the tool or knife 10 of FIGURES 1–4 is radially fed into the cylindrical surface of a roll of sheet material, the direction of feed being along an axis parallel to groove or keyway 18 and land 19 and generally radial to said roll.

FIGURE 5 portrays an alternative embodiment of the invention wherein a tool, indicated generally by the reference number 210, is provided with generally parallel blades 212 and 213 in substantially side-by-side arrangement affixed to a body 211. Advantageously the body 211 may be separable into two mating halves 211a and 211b as indicated by parting line 220.

In operation of the tool shown in FIGURE 5, the body halves 211a and 211b may be held together by a suitable tool holder (not shown), a mating dovetail or other conventional fastening means. A non-separable tool may be provided by forming from a single piece of stock.

The exterior tool faces indicated by the reference number 221 must be convergent in toward the end of the cutting tool remote from the generally arcuate convex cutting edges 215. Such convergence should provide side clearance of at least ½ degree for the tool 210 when it is advanced into a roll of sheet material.

The parallel arrangement of the cutting edge 215 is most advantageous when rolls of film having relatively small diameter cores are cut with tools shaped in accordance with the invention. If the core of the roll of film is relatively small in diameter, the blades of the tool, as illustrated in FIGURES 1 and 1a, will tend to straddle the core at the end of the cut. Such engagement of the core is avoided by employing a parallel arrangement of the blades.

Usually, it is advantageous to maintain a ratio of the length of the blade to the length of the generally arcuate edge of from about 0.1 to about 1. Such a ratio provides a stiff blade or bit that will maintain the cutting edge in a fixed position relative to the tool body.

If it is desired to remove a strip of sheet material from a supply roll, a pair of right and left handed cutters are employed having the desired space between the cutting edges 15 or 215. This space between the cutting edges is equal to the width of the strip to be removed. The supply roll of film is rapidly rotated and the cutting tools fed in at the rate of approximately 1 thickness of the film per rotation of the roll.

An improved form of tool in accordance with the present invention is capable of increased slitting rates and operation over extended periods of time without necessity for resharpening the cutting edges 15 or 215. In normal operation, no breakage of the cutting edges has been encountered.

Usually the cutting speed of tools in accordance with the invention is limited primarily by the speed at which the roll may be rotated. This speed is in turn dependent upon the rotational dynamic balance of the roll. An unbalanced roll rotating at high speed develops severe vibrations. The roll must be cut at speeds below the point of severe vibrations due to the probability of mechanical failure of the rotating equipment. When rolls of film having good dynamic balance are employed, the limiting cutting speed appears to be that of the take away means. In the case where a venturi is used the cutting speed would be limited to about the speed of sound.

Tools in accordance with the invention may be fabricated from such common materials as carbon steel, tungsten carbide, silicon carbide, molybdenum steel, and other conventional cutting tool materials. Frequently, it is advantageous to braze or silver solder the previously formed blade or cutting edge to the body thus effecting an economy in the fabrication of the tool and providing adequate strength rigidity and impact resistance to said body.

*Example I*

Employing cutters as illustrated in FIGURE 1, fabricated from AISI M3 steel, a 10 inch initial diameter roll of 1 mil thick polystyrene film was mounted on an engine lathe, and the roll rotated to give an average cutting speed of about 1800 feet per minute. A series of cuts were made in the roll removing all of the polystyrene film in the path of the advancing cutter. Resharpening of the tool was not required after 102 cuts. The cutting edge remained in excellent condition.

A tool in accordance with the disclosure of application Serial No. 834,487 filed September 8, 1959, was fabricated from AISI M3 steel, heat treated in the same manner as employed for the tool used in the previous illustration. The tool was then employed under the same conditions as above illustrated with the exception that the rotational speed of the engine lathe was reduced to give an average cutting speed of about 1200 feet per minute. After 10 cuts had been made, resharpening of the tool was required. It was observed that the cutting bits were badly worn and portions of cutting edge adjacent to the point had flaked away.

From the foregoing comparison, it is obvious that the tools fabricated in accordance with the invention give vastly improved slitting speed, improved life and provide a much more economical and advantageous mode of operation.

*Example II*

In a manner similar to Example I and employing a knife in accordance with the present invention, a series of cuts were made in rolls of 1 mil polyethylene film. A total of about 300,000 feet of film were cut at a cutting rate of about 2,550 feet per minute. The tool was examined after completion of the cuts and there was no visible sign of wear.

Similar excellent results are obtained when knives in accordance with the present invention were employed with other film and sheet material such as polypropylene, polyvinylchloride and polyvinylidene polymers, paper, polyester films (including polyethylene terephthalate) and the like.

As is apparent, the present apparatus is susceptible of being embodied with various alterations and modifications differing particularly from that which has been described in the preceding description and specification. For this reason, it is to be fully understood that all of the foregoing is merely intended to be illustrative and is not to be construed or interpreted as being restrictive or otherwise limiting of the present invention excepting as it is set forth and defined in the hereto appended claims.

What is claimed is:

1. A slitting knife adapted to be radially fed into a rotating roll of sheet material, said knife comprising a body, said body having a first end and a second end, adjacent said first end a pair of blades, said blades each having one surface generally coplanar with the adjacent surface of said body, each of said blades terminating in a generally arcuate convex edge remote from said body, said blade having at least one opposed surface generally opposite to and forming an angle of from about 5 to 30° with said coplanar surface, said surfaces intersecting at said convex edge and said opposed surface intersecting said body, the ratio of the length of the blade to the length of the arcuate edge is from about 0.1 to about 1, said coplanar surfaces of said blades converging toward said second end and said projecting surfaces having an included angle of at least 1°, said blades remote from said body being terminated by at least two edges having an included angle of from about 90 to 170°.

2. The tool of claim 1, wherein said body is comprised of two separable portions, and said separable portions provided with means to interlock with each other.

3. The tool of claim 1, wherein said generally arcuate convex edges of said blades are arranged substantially side by side.

References Cited in the file of this patent

UNITED STATES PATENTS

| 71,020 | Kents | Nov. 19, 1867 |
| 129,319 | Clark | July 16, 1872 |
| 167,645 | Cohen | Sept. 14, 1875 |
| 736,317 | Tufts | Aug. 11, 1903 |
| 763,558 | Harthan | June 28, 1904 |

(Other references on following page)

UNITED STATES PATENTS

| | | |
|---|---|---|
| 1,036,101 | Hartness | Aug. 20, 1910 |
| 1,063,680 | Hartness | June 3, 1913 |
| 1,115,024 | Rice | Oct. 27, 1914 |
| 1,327,410 | Simeone | Jan. 6, 1920 |
| 1,570,665 | Dixon | Jan. 26, 1926 |
| 1,665,213 | Lentz | Apr. 10, 1928 |
| 1,983,837 | Berwick | Dec. 11, 1934 |
| 2,164,303 | Berg | July 4, 1939 |
| 2,534,230 | Chandler | Dec. 19, 1950 |
| 2,564,136 | Verheyen | Aug. 14, 1951 |
| 2,696,883 | Broden | Dec. 14, 1954 |
| 2,734,573 | Bailey | Feb. 14, 1956 |

FOREIGN PATENTS

| | | |
|---|---|---|
| 18,484 | France | May 13, 1857 |
| 113,038 | Germany | Sept. 11, 1900 |
| 1,443 | Great Britain | Jan. 20, 1909 |
| 941,176 | Germany | Apr. 5, 1956 |